United States Patent Office 2,709,134
Patented May 24, 1955

2,709,134

PHOTO-SENSITIVE IONIC CRYSTAL MIXTURE

Harold Jacobs, Long Branch, and Dietrich Dobischek, Belmar, N. J., assignors to the United States of America as represented by the Secretary of the Army No Drawing. Application May 21, 1952,
Serial No. 289,186

4 Claims. (Cl. 95—7)

(Granted under Title 35, U. S. Code (1952), sec. 266)

The invention described herein may be manufactured and used by or for the Government for governmental purposes without the payment of any royalty thereon.

This invention relates to ionic crystal mixtures having a reversible print-out effect.

We have found that a physical mixture of alkali halides and silver halides darkens under intense light, but not much at room light and that this discoloration can be bleached by gently warming the crystal mixture which then will again darken under intense light.

The invention and its objects will become more apparent from the following description of specific embodiments.

To produce the ionic crystal mixture according to the invention we mix thoroughly finely ground potassium chloride (KCl) and silver chloride (AgCl) in various proportions. The mixture may contain between 2 to 75% AgCl but we have found that the optimum effect will be obtained by using a mixture containing roughly between 5 to 10% AgCl and 95 to 90% KCl.

Such a mixture will darken where exposed to sunlight, cathode ray screen light and the like, after an exposure of about one minute or more. The parts of the mixture which were exposed to room light only, remain white. The darkening has a purple character and becomes more intense on prolonged exposure.

If the darkened mixture is now warmed gently, for instance, by putting it on a glass plate and holding the plate above an electric heater element, the darkened mixture bleaches and takes on the original white color. Usually a temperature between 200 and 300 degrees C. is more than sufficient to bleach the mixture within a very short time, usually within a few seconds to several minutes.

In bleaching the darkened mixture, it has to be kept in mind that too high a percentage of silver chloride, that is, more than about 50%, will cause the mixture to melt at relatively low temperatures.

Instead of potassium chloride, other alkali halides may be used such as the chlorides, bromides, and iodides of sodium, potassium, lithium, rhubidium and caesium.

Instead of silver chloride, other silver halides such as silver bromide or silver iodide may be used.

The darkening of the mixture of potassium chloride and silver chloride on exposure to strong light and the bleaching on warming constitutes a surprising effect, since potassium chloride alone not darken under light, while silver chloride alone darkens under exposure to light but can not be bleached by simple warming.

The mixture, according to the invention, may be used in many combinations and for various purposes such as a recording film for cathode ray tubes, or to record shadows of sunlight, or in many other combinations in photography.

Any known method may be used to prepare a recording surface carrying the ionic crystal mixture according to the invention. The mixture may, for instance, be incorporated into gelatin or any other carrier chemically inert to the substances of the mixture. It may also be dispersed in a liquid and sprayed on an appropriate surface together with suitable binders, or mixed into a varnish or the like and painted on paper, textile, wood, etc.

Two or more alkali halides may be mixed with one or more silver halides and inert fillers may also be incorporated into the mixture.

We claim:

1. Solid state ionic crystal powdered mixture comprising 95 to 90% finely ground alkali halides and 5 to 10% silver halides, said solid state powdered mixture darkening under intense light and said darkened mixture bleaching on warming.

2. Print-out paper the sensitive layer of which comprises a mixture of 95 to 90% finely ground alkali haldies and 5 to 10% silver halides, said mixture darkening under intense light and said darkened mixture bleaching on warming.

3. Solid state, ionic crystal mixture comprising not less than 25% of finely ground alkali halides and not less than 2% silver halides, said mixture darkening under intense light and said darkened mixture bleaching on warming.

4. Print-out paper, the sensitive layer of which comprises a solid state ionic crystal mixture of not less than 25% of finely ground alkali halides and not less than 2% silver halides, said mixture darkening under intense light and said darkened mixture bleaching on warming.

References Cited in the file of this patent

UNITED STATES PATENTS 2,401,051      Crouse et al. _____ May 28, 1946

OTHER REFERENCES

Clerc, Photography, Theory and Practice, 2nd ed. (1937), Pub. Sir Isaac Pittman & Sons, N. Y. C., pages 347 and 348.

The Amateur Photographer, volume 18, October 6, 1893.